(12) United States Patent
Zacche' et al.

(10) Patent No.: US 8,230,893 B2
(45) Date of Patent: Jul. 31, 2012

(54) DEVICE FOR ROTATING CONTAINER PLATES IN A LABELING APPARATUS

(75) Inventors: Vanni Zacche', Mantova (IT); Daniele Marastoni, San Giovanni in Persiceto (IT)

(73) Assignee: Sidel S.p.A., Parma (IT)

( * ) Notice: Subject to any disclaimer, the term of this patent is extended or adjusted under 35 U.S.C. 154(b) by 603 days.

(21) Appl. No.: 11/917,984

(22) PCT Filed: Jun. 2, 2006

(86) PCT No.: PCT/EP2006/005279
§ 371 (c)(1),
(2), (4) Date: Oct. 13, 2008

(87) PCT Pub. No.: WO2006/136276
PCT Pub. Date: Dec. 28, 2006

(65) Prior Publication Data
US 2010/0206490 A1 Aug. 19, 2010

(30) Foreign Application Priority Data
Jun. 20, 2005 (IT) .............................. PR2005A0031

(51) Int. Cl.
*B65C 9/04* (2006.01)
*F16H 53/06* (2006.01)
(52) U.S. Cl. ........ 156/566; 156/447; 156/458; 156/567; 156/556; 198/449; 198/450

(58) Field of Classification Search .................. 156/566, 156/447, 458, 567, 573, 556, 570, DIG. 26, 156/DIG. 27
See application file for complete search history.

(56) References Cited

U.S. PATENT DOCUMENTS

| | | | |
|---|---|---|---|
| 3,791,897 A * | 2/1974 | Mesly ............................ | 156/137 |
| 4,531,995 A | 7/1985 | Gau | |
| 5,017,261 A | 5/1991 | Zodrow et al. | |
| 5,271,793 A | 12/1993 | Seifert et al. | |
| 5,326,422 A * | 7/1994 | Kronseder ..................... | 156/566 |
| 2002/0185233 A1 * | 12/2002 | Ballarotti ...................... | 156/556 |
| 2003/0137089 A1 * | 7/2003 | Rode ............................. | 267/159 |

FOREIGN PATENT DOCUMENTS
WO WO 03/029083 A1 4/2003
* cited by examiner

*Primary Examiner* — George Koch
(74) *Attorney, Agent, or Firm* — Pearne & Gordon LLP

(57) ABSTRACT

The invention is generally applicable to labeling apparatus, and relates to a device (10) for rotating Container plates in a labeling apparatus; such device (10) being engaged by at least two wheels (1) with a cam (5) for guiding and rotating it, so that the plate connected therewith is also rotated; each wheel (1) consisting of at least one rigid element (2) and at least one elastic disk (3) coupled thereto, having a greater outside diameter, so that the cam (5) is first contacted by said elastic disk (3). As the load between the elastic disk (3) and the cam (5) is increased, and such disk (3) is elastically deformed, the cam (5) is contacted by the rigid element (2).

6 Claims, 2 Drawing Sheets

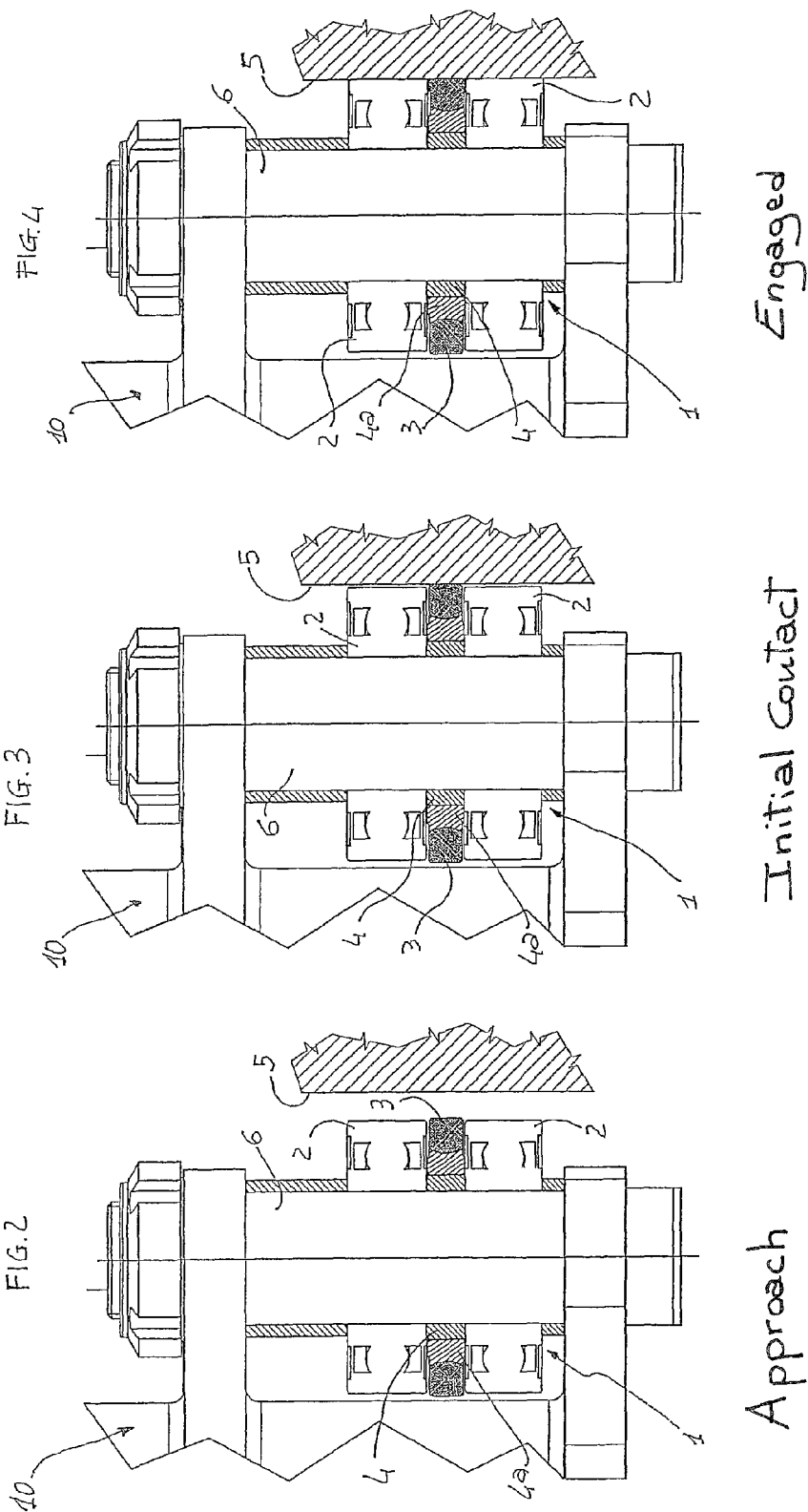

DEVICE FOR ROTATING CONTAINER PLATES IN A LABELING APPARATUS

Figure 1:
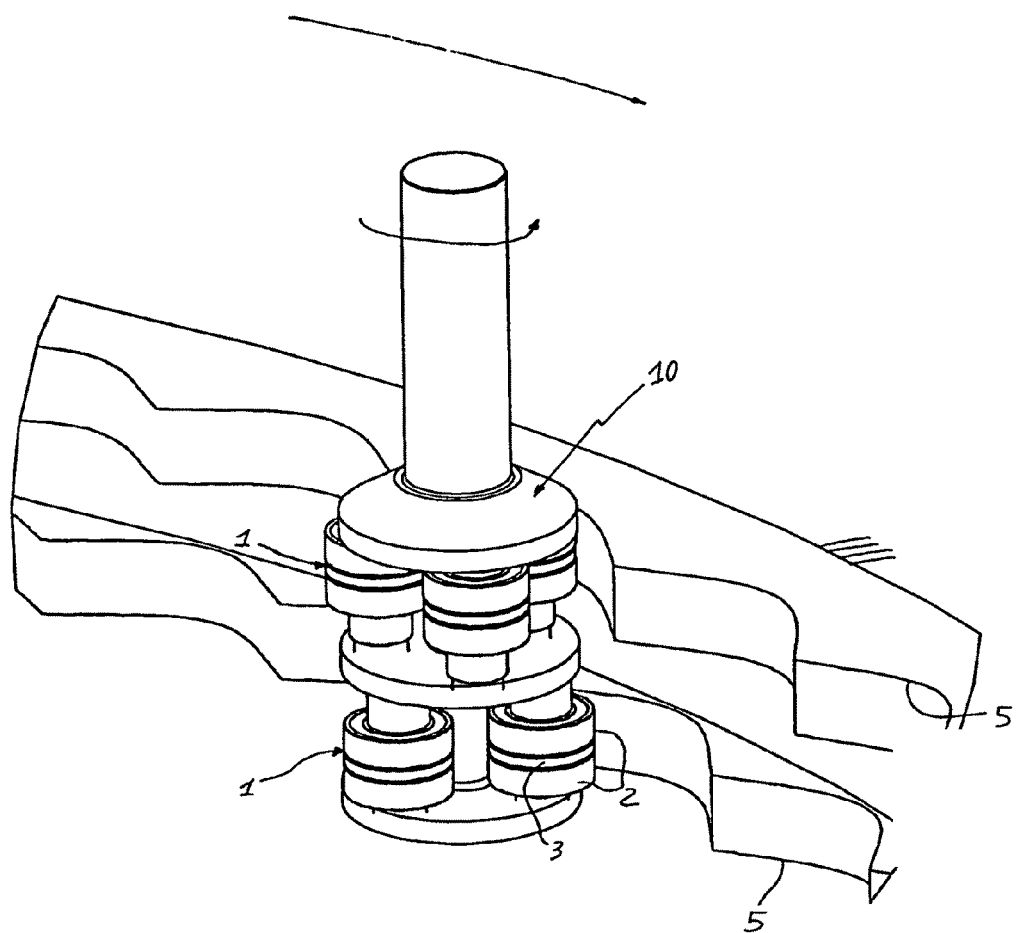

This application is a national stage entry of PCT/EP2006/005279, filed Jun. 2, 2006.

This invention relates to a device for rotating container plates in a labeling apparatus.

In the field of labeling, rotary or carousel apparatus for labeling containers are well known and widely used; they allow to maintain a high production rate.

Such labeling apparatus have a plurality of plates on which the containers to be labeled are held using well-known systems, that are not part of this invention; in a given angular path of the carousel, the plates—and the containers held thereon—are rotated about their own axes under a particular law of motion, while the label is fed along the periphery of the bottle so that it can adhere thereto.

The label is attached to the bottle using hot or cold glues, or by heat sealing, which results in the label film being heat shrunk.

According to the above, as the label is fed, the container is rotated by its plate; the start time and the law of rotary motion are imparted by suitable known lobed cams, which guide one or more sets of rollers or bearings kinematically connected to the overlying plate to impart the desired rotary motion thereto.

This technique uses several different types of rollers, which may be made of more or less rigid materials.

The advantage of using yielding materials is a low noise level when contact is established, however the particular configuration of the roller, which is not suitable to operate at high roller-cam contact loads, reduces the accuracy of the system.

The advantage of using hard materials is to afford high bearing-cam contact load values, and to reach a higher motion accuracy.

Nevertheless, this solution has the drawback of causing a high noise level.

The above is also explained by considering that, as mentioned above, rotation is only imparted along a given angular arc of the whole motion of the plate along the carousel: otherwise stated, the rollers or bearings engage the corresponding lobed cams at intervals of the round angle along which they run, which is a more disadvantageous situation as compared with permanent contact between the parts.

As a result, prior art cannot assure that contact between the rotary device and the cam occurs with such a load between contacting parts as to recover clearances, reduce the noise level during first contact and assure a high motion control accuracy.

The present invention has the object of obviating the above drawbacks, by providing a rotating device that is suitably constructed as defined in the claims below.

The advantages achieved by this device may be summarized as follows:

Operation under high loads;
Considerable noise reduction as the cam and the rotary device first come in contact with each other and as long as they remain coupled.

These objects and advantages are achieved by the plate rotating device according to this invention, which is characterized by the annexed claims.

These and other features will be more apparent from the following description of a few embodiments, which are shown by way of example and without limitation in the accompanying drawings, in which:

FIG. 1 shows a plate rotating device having a lobed cam;
FIG. 2 shows a detail of the plate rotating device, i.e. a wheel, as it approaches;
FIG. 3 shows the wheel of FIG. 2 as contact is first established;
FIG. 4 shows the wheel of FIG. 2 in a full contact condition.

Referring to FIG. 1, numeral 10 designates a device for rotating bottle plates in a labeling apparatus; more precisely, the device 10 is placed in the lower portion of such labeling apparatus and is adapted to control the motion of the overlying plates.

Along the circular path imparted by the labeling apparatus to each plate, the device 10 engages a cam 5, usually a lobed cam, which is adapted to guide the device 10; the latter is connected, by known mechanisms, not shown, to the overlying plate to impart the desired rotation thereto.

The cam 5 has at least two cam tracks on different planes.

Considering the device 10 in greater detail, FIG. 2 shows one of the above mentioned wheels, which is generally designated by numeral 1.

Such wheel 1 is composed of two rigid elements 2, which are coupled together by an elastic disk 3 interposed therebetween.

Both elements are mounted on a pin 6, which is in turn fixed to the device 10.

FIG. 2 also shows that the elastic disk 3 has a greater external diameter than the rigid elements 2, so that the cam 5 is first contacted by said elastic disk.

The first contact condition is shown in FIG. 3, in which the above situation is represented.

Spacer rings 4 are placed between the disk 3 and the elements 2, to compress and widen the disk 3 as the contact load of the cam 5 is increased.

Thus, as shown in FIG. 4, as the load is increased the rigid elements 2 will only support the contact with the walls of the cam 5, whereas the elastic disk 3 will be compressed and retained thereby.

It can further be appreciated that the disk 3 is held in position by another spacer element 4a, which acts as a positioner for the disk 3.

While this embodiment specifically includes two rigid elements and an elastic element, the number of such parts may be varied, depending on the type of labeling apparatus or the load to be supported by each wheel 1 of the device 10, without departure from the scope of the invention.

Therefore, there may be provided multiple elastic disks 3, even external to the elements 2, or a single rigid element 2 interposed between two elastic disks 3.

It will be appreciated that the rigid element 2 may alternatively be a ball bearing, a roller bearing, a needle bearing or simply a wheel with a plain bearing.

The invention claimed is:

1. A device (10) for rotating container plates in a labeling apparatus; said device (10) comprising at least two wheels (1) and engaging by said at least two wheels with a cam (5) for guiding and rotating it, so that the plate connected therewith is also rotated; characterized in that each wheel (1) consists of at least two rigid elements (2) and at least one elastic disk (3) coupled thereto; the elastic disk (3) being interposed between the two rigid elements (2) and having a greater external diameter than the two rigid elements (2), so that the cam (5) is first contacted by said elastic disk (3).

2. A device (10) as claimed in claim 1, characterized in that the disk (3) and the rigid element (2) are axially spaced apart to allow the disk (3) to be compressed as a result of an increased load on the cam (5), once a first contact has been established.

3. A device (10) as claimed in claim 1, characterized in that, once the first contact is established, due to said increased load, contact between the wheel (1) and the cam (5) occurs at the rigid element (2).

4. A device (10) as claimed in claim 1, characterized in that the rigid element (2) is a ball bearing, a roller bearing, a needle bearing or a plain bearing.

5. A device (10) as claimed in claim 4, characterized in that the element (2) and the disk (3) are kept apart by spacer rings (4).

6. A device (10) as claimed in claim 2, characterized in that, once the first contact is established, due to said increased load, contact between the wheel (1) and the cam (5) occurs at the rigid element (2).

* * * * *